United States Patent [19]

Lerfald

[11] Patent Number: 5,020,074
[45] Date of Patent: May 28, 1991

[54] LASER ALIGNMENT SYSTEM

[76] Inventor: Gordon H. Lerfald, 378 Chapel Ridge, Hazelwood, Mo. 63042

[21] Appl. No.: 483,809

[22] Filed: Feb. 23, 1990

[51] Int. Cl.$^5$ .......................................... H01S 3/086
[52] U.S. Cl. ................................... 372/107; 356/363
[58] Field of Search .................. 372/29, 31, 55, 93, 372/107, 64; 356/363, 354

[56] References Cited

U.S. PATENT DOCUMENTS

| | | | |
|---|---|---|---|
| 3,437,955 | 4/1969 | Enloe et al. | 372/29 |
| 3,614,235 | 10/1971 | Murnerlyn | 356/354 |
| 3,977,788 | 8/1976 | Moore | 372/29 |
| 3,999,858 | 12/1976 | Hernquist et al. | 372/107 |
| 4,387,462 | 6/1983 | Markus | 372/33 |
| 4,438,514 | 3/1984 | Chenausky et al. | 372/64 |
| 4,676,649 | 6/1987 | Phillips | 356/363 |
| 4,815,094 | 3/1989 | Cantoni | 372/107 |
| 4,891,819 | 1/1990 | Sutter, Jr. et al. | 372/93 |

OTHER PUBLICATIONS

Hernquist and Firester, "Prealignment of Gas Laser Cavities", Review of Scientific Instruments, vol. 46, No. 8, 8-75, pp. 1040–1042.

*Primary Examiner*—Frank Gonzalez
*Assistant Examiner*—Susan S. Morse
*Attorney, Agent, or Firm*—Timothy H. Courson; Benjamin Hudson, Jr.; Gregory A. Cone

[57] ABSTRACT

A method and apparatus for precisely aligning waveguide lasers. Each optical element of a waveguide laser is systematically and independently adjusted relative to pertinent waveguide segments. A test laser beam is propagated into a waveguide segment which is adjacent to a selected end port substantially parallel to the longitudinal axis running through the center of the waveguide segment so that the test laser beam contacts opposing wall portions along two axes of the selected end port. The test laser beam is reflected through each successive waveguide segment, the diffraction patterns of the reflected test laser beam are detected at the end opposite the reflecting means, and the reflecting elements are adjusted until the diffraction patterns of the reflected test laser beam are substantially symmetrical. After the test laser beam has propagated through all waveguide segments, it is reflected off the endmost reflecting element and back through the waveguide laser so that the beam exits through the selected end port. The diffraction patterns of the reflected test laser beam are then detected, and the position of the endmost reflecting element is adjusted until the diffraction patterns of the test laser beam are substantially symmetrical. As a final step, the reflecting element mounted adjacent to the selected end port is adjusted.

22 Claims, 2 Drawing Sheets

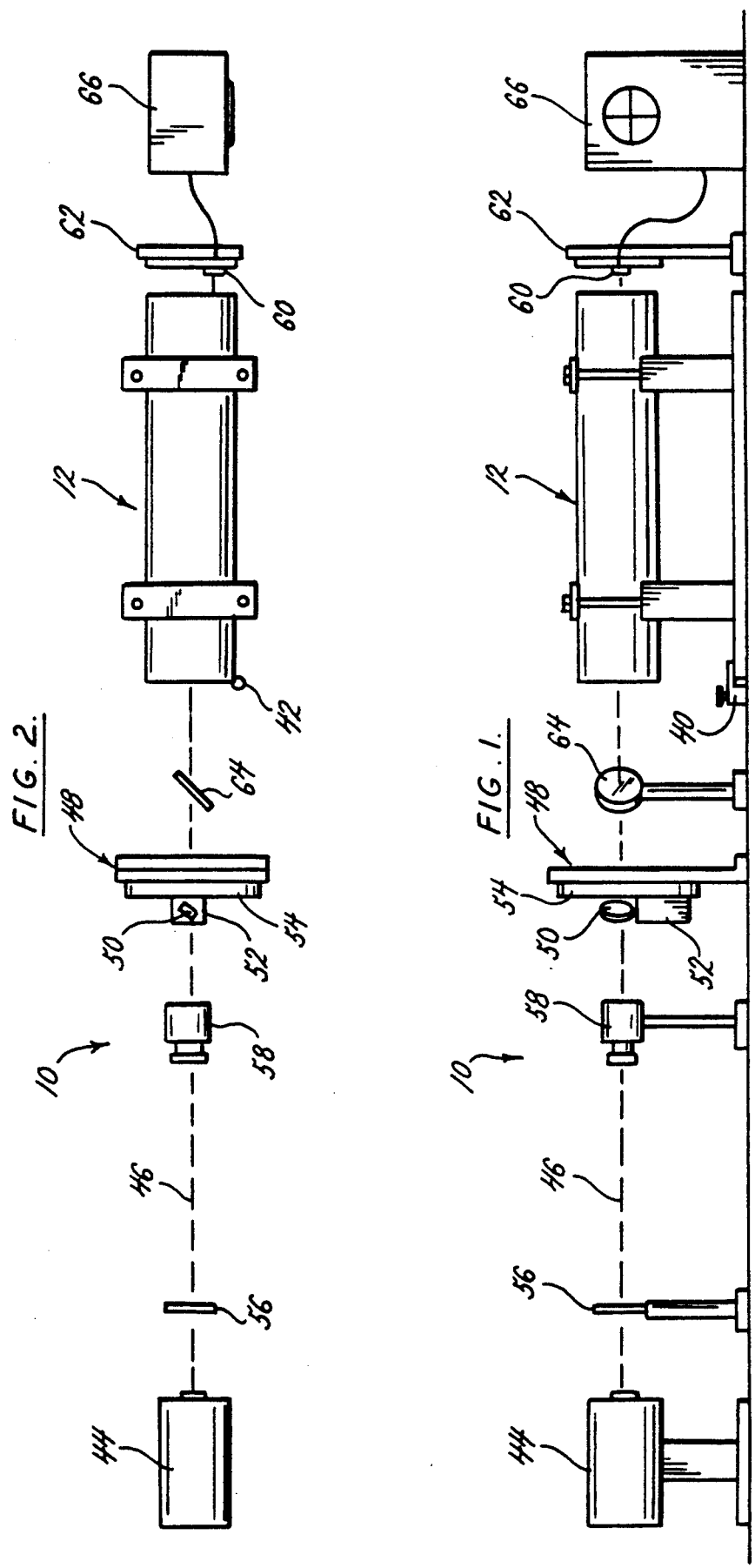

LASER ALIGNMENT SYSTEM

BACKGROUND OF THE INVENTION

1. Field of the Invention

The present invention generally relates to laser alignment and, more particularly, is concerned with a new and improved method and apparatus for precisely adjusting the optical elements of a waveguide laser having at least one waveguide segment. Features of the present invention can also be used in non-waveguide laser systems such as free space mode lasers.

2. Description of the Prior Art

Because light can be propagated over relatively large distances in waveguides without an appreciable reduction in power density, waveguide lasers are in increasing demand for medical, industrial, and military applications. In contrast to conventional lasers where feedback and resonator modes are established by normal free space propagation, waveguide lasers incorporate a resonator wherein radiation is transmitted in part by guided wave propagation.

Advantages of waveguide laser systems as compared to conventional lasers include: reduced laser size due to a reduction in bore diameter; increasing gain per unit length with decreasing bore diameter; higher gas pressures resulting in increased optical bandwidth; high pressure operation resulting in potential increased frequency tunability in molecular lasers such as $CO_2$; efficient matching between the laser mode volume and the laser excitation region; and excellent mode control through the unique properties of waveguide laser resonators.

Examples of waveguide gas lasers are disclosed in the following U.S. patents: U.S. Pat. No. 4,103,255 to Schlossberg; U.S. Pat. No. 4,19,251 to Laakmann; U.S. Pat. No. 4,577,323 to Newman et al; and U.S. Pat. No. 4,438,514 to Chenausky et al.

Because increasing the active gain length of a waveguide laser can yield higher output power, folding the waveguide bore of a waveguide laser can increase output power. As such, folded waveguide lasers are increasingly used for compact, high power laser packaging. Folded waveguide lasers are discussed in "Comparison of Waveguide Folding Geometries in a $CO_2$ Z-Fold Laser," by P. E. Jackson, Applied Optics, 1 Mar. 1989, Vol. 28, No. 5, pp. 935-41.

Folded waveguide lasers typically include an optical cavity (also known as a waveguide bore) extending between two end reflectors. At least one intermediate fold reflector is arranged with the two end reflectors such that a continuous optical path between the two end reflectors is provided by way of successive reflections from each folding reflector in a predetermined sequence; each part of the optical path between consecutive reflecting elements along the length of the optical path defines a waveguide segment. Waveguide lasers also typically include an active medium filling at least some of the waveguide segments in addition to an excitation means for producing laser action in the active medium.

Although folded waveguide lasers can yield longer overall gain lengths in a compact laser package, there are important problems to be solved in the fabrication and alignment of fully optimized folded waveguide lasers. In particular, misalignment of waveguide laser optical elements may result in degraded laser performance as evidenced by reduced laser power, unstable mode changes, reduced beam quality, and beam pointing instabilities. Furthermore, stable, single mode operation of a folded waveguide laser is unlikely to persist if one or more fold reflectors is misaligned. It is therefore necessary to precisely adjust waveguide laser optical elements so that radiation is optimally coupled from one waveguide segment to the other, in order to obtain optimal laser operation. The desired effect is to provide a folded waveguide path which, to the propagating laser radiation, is equivalent to that of a precisely machined waveguide bore produced in a single, straight section which has the full length of the laser cavity.

No satisfactory system has been set forth for precisely adjusting the optical elements of a waveguide laser so that the laser, when operating, is optimally aligned. A known method for adjusting optical elements involves roughly aligning end and fold reflectors during waveguide fabrication; the laser is then filled with gas and the optical elements are aligned through trial and error. This procedure may be acceptable for non-folded waveguide laser system because the degrees of freedom are sufficiently small—a reasonable amount of iterative adjustment may result in optimum laser performance, as evidenced by laser output power, beam quality, etc. This fabrication procedure does not, however, work well for folded waveguide lasers. Because of the added degrees of freedom in a system with two or more waveguide segments (such as a three segment Z-fold waveguide laser having four mirrors, each with two degrees of angular freedom), misalignment of one optical component can be compensated for by misalignment of one or more of the other components, with no way of determining the true status. Such misalignment may manifest itself as hypersensitivity of the laser operation (e.g., switching to undesired modes), in response to temperature or vibration environment. Attempts to improve performance by trial and error are extremely difficult and tedious, even for those highly experienced individuals trained in the fabrication of waveguide lasers.

Another technique for producing a properly aligned waveguide laser is to machine mounts and mounting flanges to sufficient precision so that, during assembly, the optical components will be adequately aligned. This approach has proven unsatisfactory because the required precision is extremely high, making this approach difficult, time consuming, and expensive.

Under current methods, then, the precision alignment of waveguide lasers is extremely difficult to achieve. Procedures heretofore employed for adjusting optical elements depend on trial and error adjustments to a completely fabricated laser.

The present invention employs the laws of diffraction for optimally aligning a waveguide laser. As disclosed in "Physical Optics," by R. W. Wood, published 1988 by the Optical Society of America, pp. 220-222, when parallel light is partially blocked by a thin edge, a diffraction pattern is formed. This diffraction pattern has a bright fringe, brighter than the non-diffracted light, located at the edge of the shadow. Away from the shadow, the intensity approaches that of the light source because no diffraction occurs.

The inventor has observed that diffraction along a waveguide wall is similar to diffraction at a thin edge except that diffraction occurs at many points along a waveguide wall and adds to the maximum intensity of the diffraction pattern. If parallel light propagates parallel to the waveguide and grazes two opposing walls of the waveguide, then the number of diffractions on both walls is equal causing a symmetrical diffraction pattern. If, on the other hand, the light does not propagate parallel to the waveguide walls, then the number of diffractions is greater on one wall than the other, producing a diffraction pattern having a higher peak intensity on one side than the other.

The inventor has further observed that the symmetry of the diffraction is extremely sensitive to the angular alignment between the light and the waveguide walls. For example, in the preferred embodiment of the present invention, deliberate misalignment of parallel light by 0.1 mrad with respect to waveguide walls results in a detectable, unsymmetrical diffraction pattern. Furthermore, tests of the repeatability of setting the alignment of a 450 mm long waveguide show it can be reliably returned to the same position within ±0.05 mrad.

Employing the laws of diffraction, the present invention overcomes the limitations of previous alignment techniques by providing a system for precisely adjusting the optical elements of a waveguide laser during fabrication.

SUMMARY OF THE INVENTION

The present invention provides a new and improved method and apparatus for precisely aligning a waveguide laser having at least one waveguide segment. Each optical element of a waveguide laser is systematically and independently adjusted relative to pertinent waveguide segments. Such adjustment can be performed both during and after assembly of the waveguide laser. In the preferred embodiment of the disclosed invention, the resulting waveguide laser can be optimally aligned to a precision on the order of ±0.1 mrad.

The apparatus of the present invention includes both a lasing element, or elements, for producing a test laser beam or beams (hereinafter referred to as the test laser beam) and a means for systematically detecting the diffraction pattern intensities of the test laser beam. The test laser beam is propagated through the waveguide laser to be aligned and the diffraction pattern of the test laser beam is then measured at each end of each waveguide segment.

To practice the method of the present invention, the test laser beam is aligned so that it propagates into one of the ends of the waveguide bore of the waveguide laser (hereinafter referred to as the selected end port) and through the waveguide segment of the waveguide laser which is adjacent to the selected end port (hereinafter referred to as the first waveguide segment) substantially parallel to the longitudinal axis running through the center of the first waveguide segment so that the test laser beam contacts opposing wall portions along two axes of the selected end port.

The above alignment step is preferably accomplished by detecting the diffraction patterns of the test laser beam at the end of the first waveguide segment opposite the selected end port along two axes substantially parallel to the first and second axes described above. For this detection step and all other detection steps in the alignment procedure, these axes are typically chosen to coincide with the adjustment planes of the pertinent optical components so that the maximum diffracted light is intercepted by the detecting means. The position of the test laser beam is then adjusted relative to the first waveguide segment so that the diffraction patterns are substantially symmetrical.

If the waveguide laser being aligned has more than one waveguide segment, the following procedures are employed after performing the above alignment step: mounting each intermediate reflecting element so that the test laser beam reflects through each successive waveguide segment, detecting the diffraction patterns of the reflected test laser beam at the end opposite the reflecting element, and adjusting the reflecting elements until the diffraction patterns of the reflected test laser beam are substantially symmetrical. Note that if the waveguide laser has only one waveguide segment, these mounting, reflecting, detecting, and adjusting steps are not performed.

After the test laser beam has propagated through all waveguide segments, it is reflected off the endmost reflecting element and back through the waveguide laser so that the beam exits through the selected end port. Following this reflection step, the diffraction patterns of the reflected test laser beam are detected, and the position of the endmost reflecting element is adjusted until the diffraction patterns of the test laser beam are substantially symmetrical.

As can be evidently seen, the present invention provides an economical, reliable, and time saving system for precisely aligning waveguide lasers. Because reflecting elements do not require adjustment after assembly of the laser, fabrication can be simplified while production costs can be reduced. Other advantages inherent in the present invention will become apparent in the following description of the preferred embodiment.

BRIEF DESCRIPTION OF THE DRAWINGS

FIG. 1 is a perspective view of the laser alignment system in accordance with the present invention;

FIG. 2 is a top plan view of the alignment system of the present invention;

DETAILED DESCRIPTION OF THE PREFERRED EMBODIMENT

Figure 3:
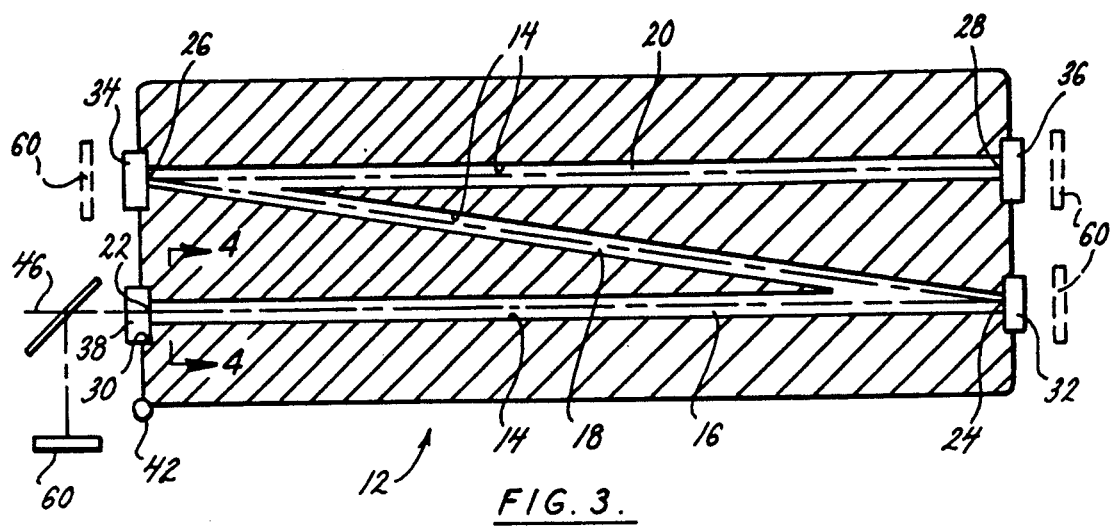
FIG. 3 is an enlarged view of Z-fold waveguide laser 12 of FIG. 2.
Figure 4:
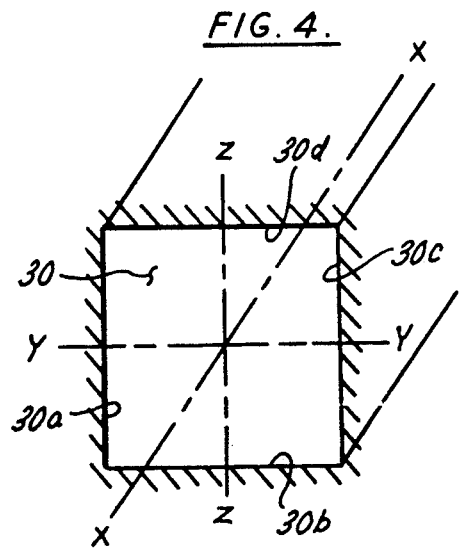
FIG. 4 is a cross-sectional view of selected end port 30 of FIG. 1.

Referring now to the drawings and more particularly to FIGS. 1 to 3, there is shown a system, generally designated 10, for aligning a waveguide laser. In the preferred embodiment, alignment system 10 is employed to align Z-fold waveguide laser 12 which includes waveguide bore 14 having two ends 22 and 28; waveguide bore 14 is folded into waveguide segments 16, 18, and 20 having ends 22-28. As shown in FIG. 4, end port 30, consisting of sides 30a-30d, is located at end 22 of waveguide segment 16 where the operative laser beam of waveguide laser 12 emanates. Axis Y—Y runs through the center of end port 30 and is parallel to sides 30b and 30d, while axis Z—Z, orthogonal to axis Y—Y, runs through the center of end port 30 and is parallel to sides 30a and 30c.

Note that while the preferred embodiment describes the alignment procedure for a Z-fold waveguide laser, the procedure can be used with other folded waveguide geometries, including U-fold, V-fold, and X-fold configurations. Additionally, while a waveguide laser having a waveguide bore of square cross section is employed in the preferred embodiment, the alignment system can be applied to various waveguide bore geometries, including circular, oval, and rectangular.

As illustrated in FIGS. 1 to 3, waveguide laser 12 also includes reflecting elements 32, 34, 36, and 38 as optical components. These reflecting elements are adjustable in orthogonal planes parallel to plane X-Y (i.e., the plane defined by axis X—X and Y—Y) and plane X-Z (i.e., the plane defined by axis X—X and axis Z—Z), respectively. Note that these reflecting elements may be adjusted either manually or mechanically; manual adjustment could be accomplished using a hex head screw and hex wrench, while mechanical adjustment could be accomplished with a servomechanism. Reflecting elements 32 and 34 are intermediate fold mirrors, while reflecting elements 36 and 38 are end mirrors. Reflecting element 36 functions as the endmost mirror since it is the reflecting element located at the end of waveguide bore 14 which is opposite end port 30, and reflecting element 38 functions as the final mirror since it is the reflecting element located nearest end port 30. The surfaces of reflecting elements 32, 34, and 36 are highly reflective while the surface of reflecting element 38 is partially reflective.

Alignment system 10 includes pivot clamp 40, which allows limited rotation of waveguide laser 12 about pivot point 42 by permitting limited movement of the end of the waveguide laser opposite pivot point 42 during the alignment procedure described below.

Alignment system 10 further includes a lasing element 44 which produces test laser beam 46. In the preferred embodiment, lasing element 44 is a helium-neon laser.

Alignment system 10 further includes a linear scanned photodiode array 60 mounted on rotatable mount 62. Linear scanned photodiode array 60 is employed to detect the diffraction patterns of test laser beam 46 at the end of each waveguide segment during the alignment procedure as described below. Oscilloscope 66 is coupled to linear scanned photodiode array 60 to indicate the intensity of the diffraction pattern detected by linear scanned photodiode array 60. The output of linear scanned photodiode array 60 drives the vertical axis of oscilloscope 66 while the horizontal sweep is triggered by a pulse which is generated at the start of each sweep of the linear scanned photodiode array. Optimal alignment is therefore indicated in real time by an easily recognizable and unambiguous symmetrical pattern on oscilloscope screen 66. Note that the accuracy of alignment is limited by the quality of detecting means.

In order for the proper diffraction pattern to occur, the test laser beam must touch two opposing wall portions of the waveguide segments. If the test laser beam used in the present invention does not simultaneously touch two opposing wall portions, the apparatus preferably includes a means for laterally translating the test laser beam continuously between two opposing wall portions. If the test laser beam is translated, the translation is preferably synchronized with the scan of the linear scanned photodiode array so that, at any point in time, the laser beam strikes the area of the linear scanned photodiode array which is being scanned.

These axes are preferably chosen to coincide with the adjustment axes of the waveguide laser mirrors. Such contact can be accomplished by a test laser beam which simultaneously contacts opposing wall portions; alternatively, this contact can be accomplished with a test laser beam which is laterally translated along each axis, in succession, so as to contact opposing wall portions.

In the preferred embodiment, translating assembly 48 is employed to laterally translate test laser beam 46 continuously along either axis Y—Y or axis Z—Z. Translating assembly 48 includes tiltable plane parallel transmission plate 50 mounted on the shaft of torque motor 52 which is driven by a periodic source to continuously rotate transmission plate 50 back and forth. At the center of each rotation, test laser beam 46 is substantially normal to transmission plate 50. Translating assembly 48 is mounted on rotating mechanism 54 which allows translating assembly 48 to be manually rotated through a 90° angle while the center of transmission plate 50 remains coincident with test laser beam 46.

Neutral density filter 56, located between lasing element 44 and translating assembly 48, is employed to adjust the power of test laser beam 46 to a value consistent with the sensitivity of linear scanned photodiode array 60, while beam conditioning telescope 58, located between neutral density filter 56 and translating assembly 48, is employed to collimate test laser beam 46. Beam conditioning telescope 58 is further employed to adjust the diameter of test laser beam 46 so that test laser beam 46 remains well collimated as it propagates through waveguide bore 14 with an intensity consistent with the sensitivity of linear scanned photodiode array 60.

Beamsplitter 64, positioned at a 45° angle to test laser beam 46 between transmission plate 50 and waveguide laser 12, is employed to redirect a portion of test laser beam 46 during the alignment procedure while permitting a portion of test laser beam 46 to pass through beamsplitter 64 and propagate through waveguide laser 12.

According to the preferred method of the present invention, lasing element 44 produces test laser beam 46 which is passed through neutral density filter 56 so that the power of the test laser beam 46 is adjusted to a desired level. After test laser beam 46 has passed through neutral density filter 56, it is passed through beam conditioning telescope 58 to collimate and adjust the diameter of the beam. Laser beam 46 is then aimed to be incident on tiltable plane parallel transmission plate 50 which is rotated to produce a pure translation of test laser beam 46. Translating test laser beam 46 is subsequently passed through beamsplitter 64, before it passes into waveguide laser 12. Note that the translating step should occur after both collimating and adjusting the diameter of the test laser beam. If a translating means is not employed, then collimating and adjusting the diameter of the test laser beam can occur any time before the test laser beam propagates through the waveguide laser.

Laser beam 46 is then aligned so that it propagates into end port 30 and through waveguide segment 16 substantially parallel to longitudinal axis X—X which passes through the center of waveguide segment 16. Such alignment is accomplished by: first, translating test laser beam 46 with translating assembly 48 so that it contacts two opposing wall portions of end port 30 along axis Y—Y; second, detecting the diffraction pattern of translating test laser beam 46 with linear scanned photodiode array 60 which is positioned with its detecting length parallel to plane X-Y at end 24 and connected to oscilloscope 66 (note that dual peaks result in the detected diffraction pattern because test laser beam 46 grazes the walls of waveguide bore 14 on one side and then the other as it repeatedly translates across end port 30); third, adjusting waveguide laser 12 by rotating it about pivot point 42 in the horizontal direction until a substantially symmetrical diffraction pattern is obtained on oscilloscope 66; fourth, rotating translating assembly 48 by 90° about the center of transmission plate 50 so that test laser beam 46 is translated between the two opposing wall portions of end port 30 along axis Z—Z; fifth, detecting the diffraction pattern of translated test laser beam 46 with linear scanned photodiode array 60 which is rotated by 90° and positioned so that its detecting length lies in the X-Z plane; sixth, adjusting the position of the waveguide laser by raising or lowering the end of the waveguide laser opposite pivot point 42 until the intensity of the diffraction pattern displayed on oscilloscope 66 is symmetrical; and seventh, fixing waveguide laser 12 so that test laser beam 46 remains well aligned with waveguide segment 16 throughout the remaining procedure. Note that the above adjustment steps to achieve a symmetrical diffraction pattern may also be accomplished by adjusting the position of test laser beam 46.

After test laser beam 46 is properly aligned in waveguide segment 16, reflecting element 32 is mounted to waveguide laser 12, at end 24, so that test laser beam 46 reflects from waveguide segment 16 into waveguide segment 18. Laser beam 46 is then translated so that it contacts two opposing wall portions of end port 30 along axis Y—Y and the diffraction pattern of translating test laser beam 46 is detected with linear scanned photodiode array 60 which is positioned with its detecting length parallel to plane X-Y at end 26. Reflecting element 32 is angularly adjusted in plane X-Y until the diffraction pattern displayed on oscilloscope 60 is symmetrical. Translating assembly 48 is then rotated by 90° about the center of transmission plate 50 so that test laser beam 46 is translated between the two opposing wall portions of end port 30 along axis Z—Z. The diffraction pattern of translated test laser beam 46 is then detected with linear scanned photodiode array 60 which is rotated by 90° and positioned so that its detecting length lies in the plane X-Z. Reflecting element 32 is angularly adjusted in the X-Z plane until the diffraction pattern displayed on oscilloscope 66 is symmetrical.

After reflecting element 32 has been mounted and adjusted, reflecting element 34 is mounted at end 26 so that test laser beam 46 reflects from waveguide segment 18 into waveguide segment 20. The procedure for angularly adjusting reflecting element 34 is identical to that for reflecting element 32, except that the diffraction patterns of test laser beam 46 are detected at end 28.

If a waveguide laser is used in an alternative embodiment which has more waveguide segments than the Z-fold laser used in the preferred embodiment, then the procedure for reflecting elements 32 and 34 is repeated by mounting the reflecting element at the end of the waveguide segment where the detector was last placed and by placing the detector at the end of the next waveguide segment opposite the mirror.

After reflecting elements 32 and 34 have been mounted and adjusted, reflecting element 36 is mounted so that it reflects test laser beam 46 back through waveguide bore 14 and out end port 30. After test laser beam 46 exits through end port 30, beamsplitter 64 is employed to redirect a portion of test laser beam 46 at a right angle. Laser beam 46 is then translated so that it contacts the two opposing wall portions of end port 30 along axis Y—Y. The redirected diffraction pattern of test laser beam 46 is detected with linear scanned photodiode array 60 with its detecting length parallel to plane X-Y. Reflecting element 36 is angularly adjusted in the X-Y plane until the diffraction pattern as displayed on oscilloscope 66 is substantially symmetrical. Translating assembly 48 is then rotated by 90° so that test laser beam 46 is translated between the two opposing wall portions of end port 30 along axis Z—Z. The redirected diffraction pattern of translating test laser beam 46 is then detected with linear scanned photodiode array 60 which is rotated by 90° and positioned so that its detecting length lies in the X-Z plane. Reflecting element 36 is angularly adjusted in the X-Z plane until the diffraction pattern displayed on oscilloscope is symmetrical.

Finally, reflecting element 38 is mounted at end 22 and adjusted so that test laser beam 46 reflects off reflecting element 38, and reflecting element 38 is adjusted, so that test laser beam 46 propagates back along itself, i.e., reflecting element 38 is adjusted to be exactly orthogonal to test laser beam 46. Alternatively, because the degrees of freedom are only two, reflecting element 38 may be adjusted through trial and error methods on operating waveguide laser 12.

Although a continuous wave Z-fold laser is utilized in the preferred embodiment, the alignment system of the present invention may be used to align pulsed lasers. For example, in order to properly align a pulsed Z-fold laser having a thin film polarizer and a modulator crystal (usually mounted between end 28 and reflecting element 36), a mirror mounted on a rotary stage and a pentaprism are required in addition to the apparatus of the present invention. After reflecting element 34 is adjusted, the thin film polarizer is mounted in the waveguide laser. The pentaprism is employed to redirect test laser beam 46 by 90° after it exits end 28. The rotary stage and mirror are positioned so that redirect test laser beam 46 impinges on the mirror normal to the mirror's surface and is reflected back along itself. Reflected test laser beam 46 is redirected by the pentaprism so that it enters waveguide laser 12 at end 28 and travels back through waveguide bore 14. The mirror is then rotated through half of Brewster's angle for the thin film polarizer and the thin film polarizer is adjusted so that test laser beam 46 is reflected back on itself and through waveguide bore 14. Reflecting element 36 is then mounted and adjusted according to the procedure described above. After reflecting element 36 is adjusted, the modulator crystal is mounted and adjusted in waveguide laser 12. Test laser beam 46 is positioned to propagate through the center of waveguide bore 14. The crystal is then mounted and positioned so that test laser beam 46 is centered on the first face of the crystal (i.e., the face of the crystal that laser beam 46 hits first) and reflected back through waveguide bore 14 and out end port 30. After test laser beam 46 exits through end port 30, beamsplitter 64 is employed to redirect a portion of test laser beam 46 at a right angle. Laser beam 46 is then translated so that it contacts the two opposing wall portions of end port 30 along axis Y—Y. The redirected diffraction pattern of test laser beam 46 is detected with linear scanned photodiode array 60 with its detecting length parallel to plane X-Y. The second face of the crystal (i.e., the face of the crystal opposite the first face) is adjusted in the X-Y plane until the diffraction pattern as displayed on oscilloscope 66 is substantially symmetrical. Translating assembly 48 is then rotated by 90° so that test laser beam 46 is translated between the two opposing wall portions of end port 30 along axis Z—Z. The redirected diffraction pattern of translating test laser beam 46 is then detected with linear scanned photodiode array 60 which is rotated by 90° and positioned so that its detecting length lies in the X-Z plane. The second face of the crystal is adjusted in the X-Z plane until the diffraction pattern displayed on oscilloscope is 66 symmetrical.

The crystal mounting for pulsed lasers provides for the adjustment of each end of the crystal in both the X-Y and X-Z planes. During the procedure above, the second face of the crystal is adjusted to change the angle at which test laser beam 46 strikes the first face of the crystal. After aligning the crystal, test laser beam 46 strikes the first face of the crystal normal to its surface.

Changes and modifications in the specifically described embodiments can be carried out without departing from the scope of the invention which is intended to be limited only by the scope of the appended claims.

What is claimed is:

1. A method of aligning a waveguide laser having a waveguide bore with one waveguide segment, comprising the steps of:
   (a) propagating a test laser beam into a selected end port of the waveguide laser and through the waveguide bore substantially parallel to the longitudinal axis of the waveguide bore such that said test laser beam contacts opposing wall portions along a first axis and a second axis of said selected end port;
   (b) reflecting said test laser beam off an endmost reflecting element located at the end of the waveguide bore opposite said selected end and back through the waveguide bore so that said test laser beam exits from said selected end port;
   (c) detecting the waveguide wall diffraction patterns of said reflected test laser beam after said reflected test laser beam has exited from said selected end port; and
   (d) adjusting the position of the endmost reflecting element until said waveguide wall diffraction patterns of said reflected test laser beam are substantially symmetrical.

2. A method of aligning a waveguide laser having a waveguide bore with two waveguide segments, comprising the steps of:
   (a) propagating a test laser beam into a selected end port of the waveguide laser and through a first waveguide segment which includes said selected end port substantially parallel to the longitudinal axis of the first waveguide segment such that said test laser beam contacts opposing all portions along a first axis and a second axis of said selected end port of the waveguide laser;
   (b) reflecting said test laser beam from the first waveguide segment through a second waveguide segment disposed adjacently thereto off a first intermediate reflecting element located near the junction of the first and second waveguide segments;
   (c) detecting the waveguide wall diffraction patterns of said reflected test laser beam at the end of the second waveguide segment opposite the first intermediate reflecting element;
   (d) adjusting the position of the first intermediate reflecting element until said waveguide wall diffraction patterns of said reflected test laser beam are substantially symmetrical;
   (e) reflecting said test laser beam off an endmost reflecting element located at the end of the waveguide bore opposite said selected end and back through all waveguide segments so that said test laser beam exits from said selected end port;
   (f) detecting said waveguide wall diffraction patterns of said reflected test laser beam after said reflected test laser beam has exited from said selected end port; and
   (g) adjusting the position of the endmost reflecting element until said waveguide wall diffraction patterns of said reflected test laser beam are substantially symmetrical.

3. The method as recited in claim 2, further comprising the following steps which are performed after adjusting said first intermediate reflecting element and before reflecting said test laser beam off said endmost reflecting element, for aligning a waveguide laser having a waveguide bore with at least three waveguide segments:
   (a) reflecting said test laser beam off a further intermediate reflecting element located near the end of the waveguide segment where detection last occurred through a next waveguide segment disposed adjacently thereto;
   (b) detecting said waveguide wall diffraction patterns of said reflected test laser beam at the end of said next waveguide segment opposite said further intermediate reflecting element;
   (c) adjusting the position of said further intermediate reflecting element until said waveguide wall diffraction patterns of said reflected test laser beam are substantially symmetrical;
   for each waveguide segment 2 through n-1, where waveguide segment n is the waveguide segment adjacent to said endmost reflecting element, and waveguide segment 2 is the second waveguide segment.

4. The method as recited in claim 1, wherein said propagating step includes:
   (a) detecting the waveguide wall diffraction patterns of said test laser beam at the end of the first waveguide segment of the waveguide laser opposite said selected end port; and
   (b) adjusting the position of said test laser beam relative to the first waveguide segment so that said waveguide wall diffraction patterns of said test laser beam are substantially symmetrical.

5. The method as recited in claim 2, wherein said propagating step includes:
   (a) detecting the waveguide wall diffraction patterns of said test laser beam at the end of the first waveguide segment of the waveguide laser opposite said selected end port; and
   (b) adjusting the position of said test laser beam relative to the first waveguide segment so that said waveguide wall diffraction patterns of said test laser beam are substantially symmetrical.

6. The method as recited in claim 3, further including the step of laterally translating said test laser beam along each said axis.

7. The method as recited in claim 5, wherein said translating step includes propagating said test laser beam through a rotating tiltable plane parallel transmission plate.

8. The method as recited in claim 3, further including the step of redirecting a portion of said reflected test laser beam after said reflected test laser beam has exited from said selected end port of the waveguide laser and before said detecting step, for detecting said diffraction patterns of said reflected test laser beam.

9. An apparatus for aligning a waveguide laser having at least one waveguide segment and at least two reflecting elements, comprising:
   (a) a lasing element operative to produce a test laser beam;
   (b) means for systematically detecting the waveguide wall diffraction pattern of said test laser beam at each end of each waveguide segment of the waveguide laser, said diffraction pattern being produced by the interaction of the test laser beam with a wall of the waveguide segment; and
   (c) means for adjusting the position of the reflecting elements so that the detected diffraction patterns are substantially symmetrical.

10. The apparatus as recited in claim 9, further comprising a translating means disposed between said lasing element and the waveguide laser for laterally translating said test laser beam continuously between two opposing wall portions of said selected end port of the waveguide laser.

11. The apparatus as recited in claim 10, wherein said translating means includes a tiltable plane parallel transmission plate.

12. The apparatus as recited in claim 10, further including a rotating means for changing the axis along which said test laser beam is translated.

13. The apparatus as recited in claim 9, wherein said detecting means includes a linear scanned photodiode array.

14. The apparatus as recited in claim 9, wherein said detection means includes a rotating means for changing the plane in which said diffraction pattern is detected.

15. The apparatus as recited in claim 9, further comprising an indicator means coupled to said detecting means for indicating the intensity of said diffraction pattern.

16. The apparatus as recited in claim 15, wherein said indicator means includes an oscilloscope.

17. The apparatus as recited in claim 9, further comprising an adjusting means disposed between said lasing element and the waveguide laser for adjusting the power of said test laser beam.

18. The apparatus as recited in claim 17, wherein said adjusting means includes a neutral density filter.

19. The apparatus as recited in claim 9, further comprising a means disposed between said lasing element and the waveguide laser for collimating said test laser beam.

20. The apparatus as recited in claim 19, wherein said collimating means includes a beam conditioning telescope.

21. The apparatus as recited in claim 9, further comprising an adjusting means disposed between said lasing element and the waveguide laser for adjusting the diameter of said test laser beam.

22. The apparatus as recited in claim 21, wherein said adjusting means includes a beam conditioning telescope.

* * * * *